United States Patent [19]

Lemelson

[11] 4,093,693
[45] June 6, 1978

[54] METHOD FOR MAKING COMPOSITE ARTICLES

[76] Inventor: Jerome H. Lemelson, 85 Rector St., Metuchen, N.J. 08840

[21] Appl. No.: 117,743

[22] Filed: Feb. 22, 1971

Related U.S. Application Data

[63] Continuation of Ser. No. 848,949, Aug. 11, 1969, abandoned, which is a continuation-in-part of Ser. No. 267,262, Mar. 22, 1963, Pat. No. 3,461,197, which is a continuation-in-part of Ser. No. 651,749, Apr. 9, 1957, abandoned.

[51] Int. Cl.² ............................................. B29F 3/10
[52] U.S. Cl. .................................... 264/171; 264/174
[58] Field of Search .......................... 264/171–174, 264/178

[56] References Cited

U.S. PATENT DOCUMENTS

| | | | |
|---|---|---|---|
| 2,174,779 | 10/1939 | Delorme | 264/171 |
| 2,399,191 | 4/1946 | Abbott | 264/171 |
| 2,473,499 | 6/1949 | Abbott | 264/171 |
| 2,566,441 | 9/1951 | Camras | 264/171 |
| 2,571,457 | 10/1951 | Ladisch | 264/171 |
| 2,612,679 | 10/1952 | Ladisch | 264/171 |
| 2,773,282 | 12/1956 | Baker | 264/171 |
| 2,803,041 | 8/1957 | Hill et al. | 264/171 |
| 3,001,265 | 9/1961 | Bundy | 264/171 |
| 3,003,223 | 10/1961 | Breen | 264/171 |
| 3,050,824 | 8/1962 | Lemelson | 28/82 |
| 3,277,225 | 10/1966 | Heard | 264/174 |
| 3,333,049 | 7/1967 | Humphrey et al. | 264/171 |
| 3,347,959 | 10/1967 | Engelke et al. | 264/171 |
| 3,406,737 | 10/1968 | Duflot et al. | 164/86 |
| 3,461,197 | 8/1969 | Lemelson | 264/174 |
| 3,472,921 | 10/1969 | Fyfe | 264/174 |
| 3,557,403 | 1/1971 | Lemelson | 264/174 |

*Primary Examiner*—Jay H. Woo

[57] ABSTRACT

An apparatus and method for making composite articles of a plurality of materials including a matrix having predeterminately disposed therein a plurality of filament-like formations of one or more secondary materials which serve to substantially enhance and predetermine the strength of the matrix.

In one form the matrix is composed of metal, while the reinforcing material is composed of filaments or whiskers defining crystals of metal or ceramic materials such as boron nitride, silicon carbide, titanium nitride, etc. One form of the apparatus is operative to feed said filaments or whiskers from a supply thereof while another form is operative to extrude filaments of said materials to shape and directly feed said extruded filaments into a molten metal matrix.

In another form of the invention, a hot molten glass is formed into a plurality of filaments which are fed directly, as they are formed, into a matrix composed of a thermosetting or thermoplastic material and they serve to substantially reinforce said matrix material.

8 Claims, 5 Drawing Figures

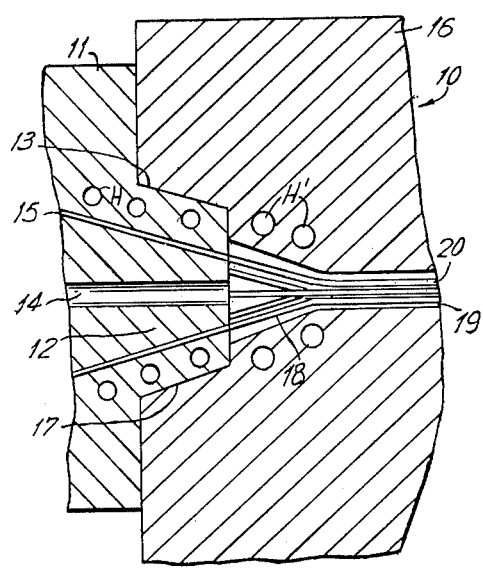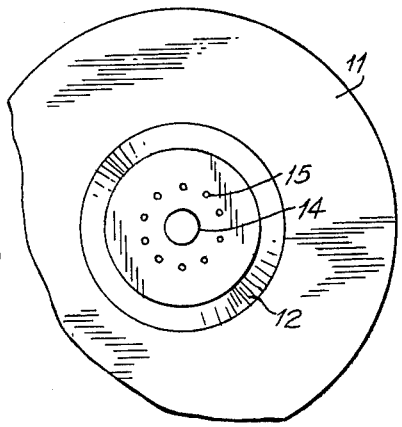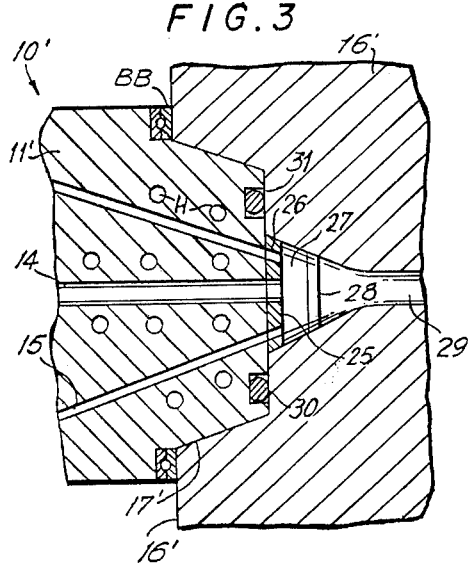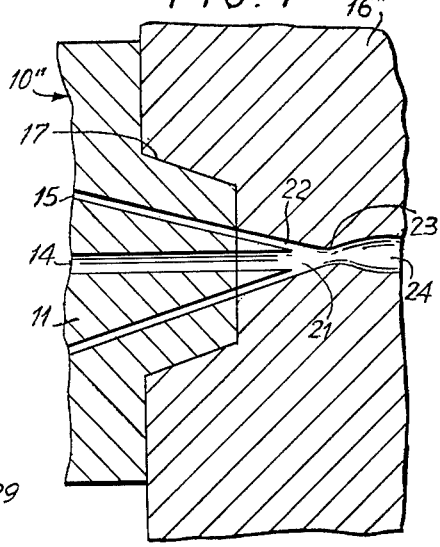

METHOD FOR MAKING COMPOSITE ARTICLES

RELATED APPLICATIONS

This is a continuation of application Ser. No. 848,949 filed Aug. 11, 1969, for Apparatus and Method for Making Composite Articles, now abandoned, which was a continuation-in-part of application Ser. No. 267,262 filed Mar. 22, 1963, for Method for Producing Composite Articles, now U.S. Pat. No. 3,641,197 which was a continuation-in-part of Ser. No. 651,749 filed Apr. 9, 1957, and entitled Plastics Fabrication, now abandoned.

SUMMARY OF THE INVENTION

This invention relates to an apparatus and method for fabricating articles of a plurality of materials including a matrix formed of a first material such as metal or a resin and a second material which is preferably, although not necessarily, formed into a plurality of filament-like elements as it is fed into said matrix, the filament-like elements becoming embedded within the matrix in a predetermined array and serving to reinforce the matrix.

It is known in the art to fabricate reinforced articles by molding a material composed of a thermosetting resin having premixed therewith prior to molding, a plurality of short filaments extending randomly throughout the resin. Certain shortcomings in the structure of such materials are experienced as a result of the limitations imposed on the length and diameter of the reinforcing filaments and the manner in which they are molded from a premix. Random arrays of filaments may be provided but little can be done to control the disposition or alignment of the filaments within the plastic due to the fact that they form a premix which must be molded by conventional compression or injection molding means.

Accordingly, it is a primary object of this invention to provide a new and improved apparatus and method for forming composite articles of manufacture comprising a body or matrix having a plurality of reinforcing filaments predeterminately disposed therein during the forming operation.

Another object is to provide an apparatus and method for molding composite articles by predeterminately feeding filaments into the main stream of a molding material as it is injected into a mold or admitted to an extrusion die.

Another object is to provide an apparatus and method for forming composite articles of metal which is internally reinforced with a plurality of filaments of high strength material disposed within the metal as it is molded or otherwise formed to shape.

Another object is to provide an apparatus and method for forming articles of resins which are reinforced with glass filaments which are continuously formed to shape immediately prior to or as they are injected into the main stream of the plastic admitted to a mold or die.

Another object is to provide an apparatus and method for forming articles composed of a ceramic matrix which is internally reinforced with filaments of ceramic or metal having a substantially higher strength than that composing the matrix.

Another object is to provide an apparatus and method for forming articles which are reinforced with a plurality of whisker-like elements which are continuously fed and predeterminately dispersed with a molten material surrounding same and composing the major protion of the fabricated article.

In the accomplishment of the above and related objects, the invention is embodied in the forms illustrated in the accompanying drawings. Attention, however, is called to the fact that the drawings are illustrated only and that changes may be made to the specific construction shown and described without departing from the spirit and scope of the invention.

In the drawings:

FIG. 1 is a sectional view illustrating a fragment of an injector assembled with a mold or extrusion die and operative for feeding a plurality of different materials therethrough for molding to a predetermined shape;

FIG. 2 is a fragmentary view of the end of the injector of FIG. 1;

FIG. 3 is a cross sectional view of a rotatable injector and mold or die assembled therewith for receiving injection material as the former rotates or oscillates;

FIG. 4 is a cross sectional view of an injector and mold or die which is a modified form of the embodiment illustrated in FIG. 1.

Figure 5:
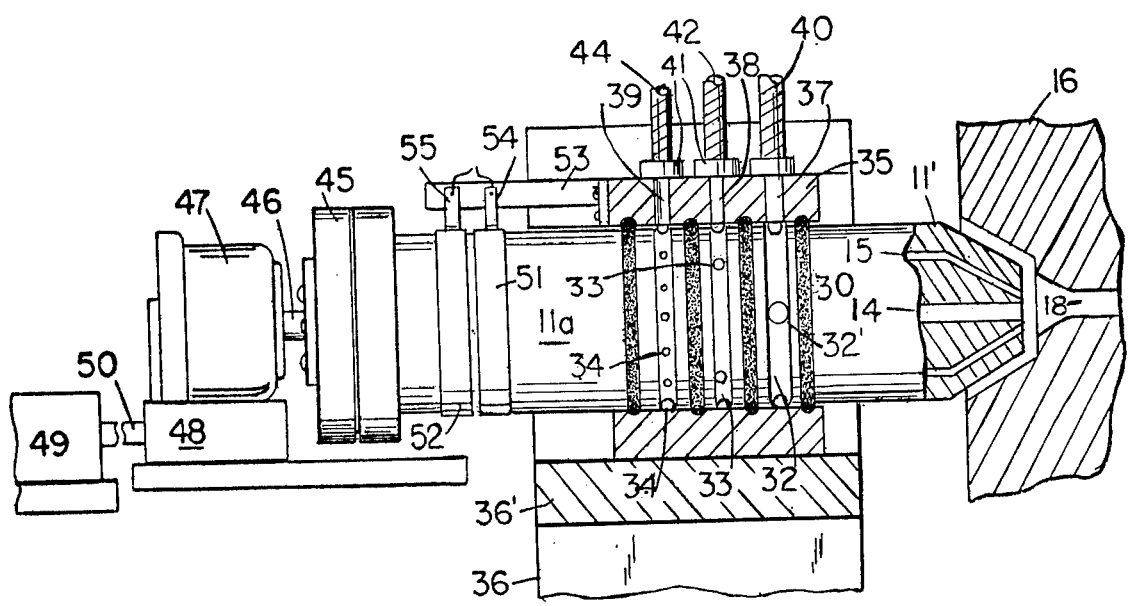
FIG. 5 is a side view with parts broken away for clarity showing further details of an apparatus of the type shown in FIG. 3.

There is shown in FIG. 1 components of a machine or assembly 10 applicable for injection molding or extruding articles of manufacture of two moldable and flowable materials of any suitable characteristic with the requisite that one may be injected or made to flow directly into the other after they have entered the die or mold. The injector 11 is illustrated as abutting and in operative engagement with he front face 16a of a die or mold 16. The tapered nose or nozzle 12 of the injector 11 is shown having its conical sidewall 13 and endwall compressively engaged against the conical sidewall and the bottom of a cavity 17 in the face 16a of the die or molde 16 so as to effect a pressure seal between the two and to permit pressurized communciation between a plurality of passageways 14 and 15 which terminate at the end of 12 and a passageway 18 in 16 terminated at the base of cavity 17. Injector 11 may be fixed relative to mold 16 or may be longitudinally removable therefrom and/or rotatable as described hereafter.

In the end view of injector 11 shown in FIG. 2, the larger passageway 14 is shown centrally passing through the nozzle 12 and a plurality of smaller passageways 15 are shown equally disposed around the central passageway. Although any suitable arrangement of said passageways is possible, depending on the desired flow configurations of materials, the configuration illustrated in which the smaller diameter passageways 15 converge as illustrated in FIG. 1 will suffice where it is desired to form or otherwise dispose a plurality of small diameter filaments in a substantially symmetrical array within a larger filament rod, tube or otherwise shaped article for decorative or reinforcing purposes. Supplemental sealing means between members 11 and 16, as illustrated, for example, in FIG. 3, may also be utilized in the apparatus of FIG. 1, if necessary. Notation H refers to a passageway or passageways extending through the nozzle portion 12 of 11 and other portions of 11 which may be utilized for circulating a liquid coolant such as water therethrough in the event that the material injected through the passageways 15 is at a substantially higher temperature than the material injected through the central passageway or passageways 14 whereby the transferred heat would ordinarily have a detrimental effect on the latter material. Notation H' refers to one or more passageways disposed in member 16 adjacent the receiving passageway 18, which may also be utilized for transferring heat from the wall of both passageway 18 and the end of nozzle 12. Control of the flow of heat transfer fluid through either or both passageways H and H' may be utilized to conrol the temperature and solidification of the materials injected into the die or mold.

Either or both the passageways H and H' or passageways adjacent thereto may contain resistance heating elements. If it is necessary to heat the injector 11 or die 16 to maintain certain thermoplastic materials flowing therethrough in a molten state or, if a termosetting resin is utilized, to heat said resin to cause it to solidify downstream of passageway 18.

In FIG. 3 the injector and mold have been modified are are referred to by the notations 11' and 16'. The injector 11' is adapted to rotate or oscillate at a predetermined rate relative to the mold or die 16' while the materials are being injected therein to perform one or more of a plurality of important functions. In other words, either or both the injector 11' or the die or molde 16' may be moved in a rotary manner relative to the other to affect the shape and distribution of the material or materials injected through the peripheral injection passageways 15. A circular channel 31 is provided in the end face of the tapered nose 12' of the injector 11' in which is retained a hollow metal O-ring 30 which normally protrudes outward from the face of the nozzle and compressively engages the bottom face of the cavity in 16' so as to effect a fluid pressure seal between the two as 11' or 16' rotate relative to each other. Notation 27 refers to the end of the passageway 29 through the mold or die 16' which either terminates at the flat bottom of the tapered cavity 17' therein or is covered by an orifice plate 25, the function of which will be described hereafter. A circular ball bearing BB is shown disposed between members 11' and 16' and preferably secured to the former to simplify the relative rotation of the two while they are compressively engaged together. Accordingly, the ball bearing is preferably positioned so as to permit compressive and sealing engagement of the O-ring 30 against the bottom face of the cavity 17'.

Also shown in FIG. 3 are means for affecting the shape of filaments of material which may be delivered through or formed by means of the outer passageways 15, after they have entered the mold chamber 27. Member 25 is a disc-shaped plate covering the end of chamber 27 and having a plurality of peripheral openings or holes 26 aligned with the openings 15 when the injector 11' is at one or more predetermined angular positions relative to 16'. When not so aligned, the openings at the end of passageways 15 are momentarily closed off by the plate 25. The material flowed into the passageways 15 will thus be intermittently injected into the chamber 27 and may form therein and be carried along in the stream flow of the material injected through the central passageway 14 and the central opening 26', as a plurality of short streams or lengths of said material which form as short filaments within the material injected into the passageway 29 directly beyond the chamber 27 or further downstream thereof. Notation 28 refers to a bar or spider-like array of small diameter bars disposed across chamber 27 which may be optionally utilized to enhance or improve mixing of the filamental elements injected through the passageways 15 of nozzle 11' by reacting thereon as the elements flow therepast. It is noted that either or both members 26 and 28 may be eliminated from the die or mold, depending on the nature of the material injected therein and the desired mixing or shaping effect on the material or materials. If both members 26 and 28 are eliminated from the assembly or mold 16', and a liquid is injected through each of the passageways 15 which may solidify as a plurality of defined filaments or streams within the liquid injected through each of the passageways 15 which may solidify as a plurality of defined filaments or streams within the liquid injected through 14 into the chamber 27, then said filaments may form a spirally extending array of filaments which may form a thread or cord extending along the center of the material formed in passageway 29. If the member 16' is an extrusion die or spinnerette, a reinforced rod, thread, rope or tube may be so formed.

FIG. 4 illustrates an injection nozzle 11 similar to the nozzle of FIG. 1 assembled with a die or mold 16" having a receiving chamber 21 terminating at the bottom wall of the cavity 17 therein which receives the tapered nose 12 of 11 as described. The chamber 21 comprises a central hole 21' aligned with the central passageway 14 in 11 and a plurality of converging holes 22 which are aligned with the peripherally extending passageways 15 through 11. Thus, material flowed through passageways 14 continues in its flow into the mold or die 16" without mixing with the material injected through 14 until it has flowed to a restricted portion 23 of the passageway therein. Beyond 23 the passageway in the mold or die 16" increases in diameter. The restriction or reduced diameter portion 23 of the passageway in 16" is provided to cause the filament elements or material injected through the passageways 15 to converge, whereafter they will be substantially centrally disposed in the passageway portion 24 and in the resulting extruded filament, thread or rod.

FIG. 5 illustrates further details of the apparatus shown in FIG. 1, with various of the details of the injection mold structure omitted for purposes of clarity. The injector 11 is illustrated as an elongated metal cylinder or rod, the rear end 11a of which is secured to a coupling 45 which is mounted on the end of a shaft 46 of a gear motor 47 adapted for rotating said coupling and the member 11. Similar means may also be provided for rotating the mold or die 16'. The gear motor 47 is mounted on a base 48 which is longitudinally movable by means of a lineal motor 49, the shaft 50 of which is coupled to 48. Both motors 47 and 49 may be of any suitable operating characteristic and may comprise electric, hydraulic or pneumatic motors which are preferably respectively speed and displacement controllable.

Notation 35 refers to a cylindrical sleeve or collar assembled along and circumscribing a central portion of the injector 11. The collar 35 moves longitudinally with the injector 11 as it is advanced and retracted by the ram or lineal motor 49 but does not rotate therewith and serves as a rotary seal or coupling through which a plurality of fluids such as the injection materials and, if utilized, a heat transfer fluid may be flowed. A plurality of holes or passageways 37, 38 and 39 extend radially through the collar from the inside surface thereof and communicate with conduits or pipes 40, 42 and 44 which are welded or retained by means of fittings 41 in sealing engagement with the collar. Each of the openings 37 to 39 communicate with respective channels 32, 33 and 34 which circumscribe the outer surface of the cylinder 11. One or more radial holes extend from each of said channels 32 to 34 to their respective longitudinal passageways, In FIG. 5, for example, the inlet 40 communicates with the collar passageway 37 which communicates with channel 32 which is connected to the central passageway 14 through one or more radial holes 32'. Liquid plastic may thus be supplied through the conduit 40 under sufficient pressure to flow into the receiving passageway 18 at a sufficient rate to completely fill and retain said chamber filled during the injection or extrusion process. Water or other coolant may be flowed through the conduit 42, into channel 33. The channel 33 is actually divided into two channel portions which communicate with each other only by means of the passageways H so that water admitted through conduit 42 and into one portion of the channel will circulate throughout the injector 11 and may be discharged or recirculated through a second conduit.

The peripherally injected liquid plastic or glass is inroduced through one or more conduit 44, flows through a passageway or passageways 39 in collar 35, thence into one or more channels such as 34 which communicate with the passageways 15 through respective radial holes therein.

Notation 36 refers to s supported base which retains a sleeve 36' through which collar 35 longitudinally moves during the movement of the injector into and away from engagement with the mold or die 16'. A plurality of O-rings 30' are compressively disposed within channels circumscribing the cylindrical wall of 11 on both sides of each of the channels 32, 33 and 34 to effect rotary pressure seals between each of said channels, the passageways in the collar and the interior and exterior surfaces of 35 and 11. The O-rings 30' are also comressively seated within channels cut in the inside wall of the collar 35 and may be made of tubular metal or high temperature resins such as silicone rubber or the like. As noted above, a heat transfer or coolant liquid may also be circulated through passageways in the collar 35 is the temperature of one or more on the injection fluids is such as to render such circulation necessary.

Variations in the methods in which the apparatus of FIGS. 1 to 5 are applicable insofar as materials and mode of operation are concerned include the following:

A. The materials injected through passageways 15 and centrally disposed passageway or passageways 14 of the injector 11 may comprise any suitable synthetic polymers, both in a molten or liquid condition and at a temperature such that the material injected through passageways 15 will form continuous filaments within the material injected through 14 whereby said filaments become encapsulated within the other material in the die or mold as both solidify downstream of the locations illustrated in the drawings. Either or both materials may comprise thermosetting resins which solidify downstream of the mixing chamber to define either an elongated extruded member or a molded shape. Thus, the filaments 15 may be utilized for reinforcing and/or decorative purposes depending on their properties. If the material injected through passageway 14 is a self-foaming plastic which expands into a cellular structure, then thermoplastic plastic injected through passageways 15 may form filaments within the member extruded within the die opening 19 which may be utilized to reinforce and serve as a core for the extrusion. Combinations of other well-known thermoplastic materials may include the injection of a low density or relatively flexible plastic such as plasticized vinyl, low or medium density polyethylene or polypropylene, flexible urethane or the like through passageway 14 and plastic having a higher tensile strength such as higher density polyethylene, polypropylene, polycarbonate, polyamide, or the like may be injected through the passageways 15 for reinforcing the more flexible material which substantially fills the receiving passageway or injection chamber 18.

B. The material injected into passageway 14 which fills the injection chamber 18, save for the filament forming material, may comprise any suitable thermoplastic or thermosetting resin while the material injected through the passageway 15 may comprise a glass or ceramic in a molten state which forms filaments within the first material which filaments are quickly carried along in the stream thereof either as elongated, reinforcing elements or a plurality of short filaments the lengths of which are defined by apparatus such as illustrated in FIG. 3. The lengths of such filaments may also be defined by intermittently injecting glass or other suitable material into the passageways 15 by, for example, valving means or the like. Depending on the rate of flow of primary injection material through passageway 14, the diameter of the passageways 15, the total amount of material flowed into the die or mold and the heat transferred from the injector nozzle, for certain applications it may be necessary to utilize a plastic which will not deteriorate or char when flowed through the passageway 14 into the mixing chamber 17. Various thermosetting and thermoplastic materials are known in the art which have relatively high melting points and will withstand the deteriorating effects of heat at temperatures about 400° to 500° F. or higher for a sufficient length of time to permit the extrusion or moldng of said material containing fibers or filaments, as described, and solidified therein. For example, formulations of epoxy, polymides and other aromatic polymers, and silicone resins will withstand temperatures of 500° F. and higher for extended periods of time so that filaments of glass of substantial diameter may be formed within the chamber 18 by the injection of molten glass streams therein. For applications where a short length of extrusion or a limited amount of material containing formed-in-place glass filaments is to be injected into a mold, cooling means in the immediate vicinity of the nozzle 12 may not be necessary since the liquid plastic injected through passageway 14 may serve as a heat transfer medium and the molten glass may be completely purged from the passageways 15 by means of air or other fluid applied immediately behind a predetermined charge of said glass.

C. The apparatus provided may also be utilized to combine by injection, as described, two metals, a metal and glass or a metal and other suitable ceramic material. For example, the primary metal which substantially fills chamber 18 and is ejected from passageway 14 may comprise a metal of a relatively low melting point such as aluminum or other suitable non-ferrous metal. The metal injected through passageways 15 to form filaments or fibers within the primary metal may comprise a metal such as steel or other reinforcing metal of higher melting point than that injected through 14. The mold or die 16 may have any suitable shape and may be provided to form extrusions of tubular or solid shape of any known configuration which are reinforced by the plurality of filaments injected through passageways 15. The metal injected through passageways 15 may be in a semi-molten condition when ejected from member 11 so as to immediately form defined filaments in the die or mold. Such metal may also be cold-expressed through openings 15 or guided through the passageways 15 in the shape of preformed wire or rod elements and drawn therefrom.

D. The material ejected from passageway 14 may comprise a molten glass or ceramic material and that ejected from passageways 15, a conducting or reinforcing metal such a aluminum, copper, steel or alloys of these materials.

E. Other materials such as powders, chips, short fibers or combinations of these materials may be forced through the openings 15 and/or 14 to combine with a molten or liquid material injected into the chamber 18 for reinforcing purposes and carried therefrom downstream of the chamber into the die or mold. If extruded, the materials may be drawn from the die.

Flow of either the primary or the peripherally produced materials may be interrupted one or more times during a cycle to vary the shape or density of the reinforcing material in the eventually extruded or molded piece. The density or other characteristics of the molded or extruded piece may also be varied or increased by means of varying the pressure applied to the material injected through the passageway 14 during a cycle of operation.

Depending on the characteristics of the materials being injected, it may be necessary to heat portions of the injector 11 in order to maintain one or more of the flowing materials in a fluid state. Accordingly, FIG. 5 shows a pair of metal slip-rings 51 and 52 insulatedly mounted on the rear portion 11a of the injector against which respective brushes 54 and 55 ride as the injector rotates. The brushes are mounted on a base 53 made of insulating material which is secured to the collar 35. One or more heating elements (not shown) are electrically connected to the slip-rings 51 and 52 and extend through passageways or holes provided in the injector 11 which are preferably immediately adjacent one or more of the passageways 14 and 15. Electrical resistance heating elements may also be provided in the collar 35 adjacent the passageways 37, 38 and 39, if necessary. It is also noted that the injector 11 is preferably made of a plurality of components which are disassembleable to permit cleaning of the passageways and repair or replacement of said heating elements.

The apparatus illustrated in FIGS. 1 and 3 may also be utilized for fabricating a plurality of different textile elements of the type shown in application Ser. No. 651,749 having a core member made of a first thread or filament which is completely surrounded by a jacket of a second material. The core thread, for example, may provide the major portion of the strength for the composite thread while the softer jacket or covering may provide a smooth texture which is substantially easier to wear and more comfortable when brought in contact with the skin of the wearer. Thus, the apparatus of FIG. 1, for example, may be operated whereby a pre-formed thread or filament is fed through the centrally disposed opening 14 while the coating material therefore is introduced through one or more of the peripherally disposed openings 15. The peripherally disposed openings may provide the major portion of the coating material in the mixing chamber 18 while a filament is formed therein by ejection from a molten or fluid state through the centrally disposed opening 14 and is carried along with the stream of material ejected from the openings 15 downstream in or beyond the spinnerette or die 16.

Material introduced through the plural openings 15 may comprise a urethane plastic containing a blowing agent which immediately foams into a cellular plastic in and beyond the mixing chamber 18 which completely surrounds the continuously fed thread or filament introduced into 18 through the opening 14 in 11 or the filament formed from the liquid material ejected through 14 into chamber 18. The core member may thus comprise a filament or thread of such plastics as polyester, polycarbonate, polypropylene, cellulose acetate rayon, nylon, epoxy and phenoxy, etc. These may be preformed and fed through 14 from a continuous supply or may be actually extruded to shape from injector 11.

F. In yet another form of the instant invention, the material introduced into passageways 15 may comprise a polymer or other material in liquid or molten form which is converted to another form during its passage through the injection nozzle or immediately after it flows into the chamber immediately in front of the injection nozzle. For example, various polymers or copolymers such as those comprising or containing acrylics, polycarbonates, or other materials may be injected through the nozzle or head 11 while said head is maintained at sufficient temperature to carbonize the injected material to form carbon or graphite filaments thereof which are of continuous length as shown in FIG. 1 or become formed into a plurality of separate short lengths by means such as shown in FIG. 3. The heat necessary to carbonize such polymers and form carbon filaments thereof may be provided by means of resistance heating elements disposed along the passageways 15, by flowing a high-temperature fluid through passageways such as those denoted H in FIGS. 1 and 3, by previously extruding, carbonizing and continuously feeding filaments into the passageways 15 or by applying heat to the streams of polymer ejected from the passageways 15 into the receiving chambers 18, 24 or 29. For example, if the material introduced into the passageways 15 is composed of a polymer or other material capable of being carbonized to form carbon or graphite filaments, and the material introduced through the passageway 14 of FIG. 1 is a metal such as aluminum, magnesium, titanium, steel or other metal cast or injected through the passageway 14 at sufficient temperature to carbonize the material introduced through passageways 15, then the apparatus may be utilized for producing continuously cast or extruded structural shapes or for casting of injection molding the graphite-containing molding material into a die or mold.

G. Other materials which may be added to the extrusion or molding through either passageways 14 or 15 may include glass beads, chips, flakes or the like which impart optical or strength characteristics to the extrusion or molding formed in or beyond mold or other tool 16. Reinforcing fibers such as glass, asbestos, ceramic, carbon, metal whiskers, boron, etc., or synthetic plastic fibers cut to short lengths may also be introduced under pressure per se or in mixture with a fluid plastic material through the passageway 14 and/or passageway 15. A continuously formed glass thread may also be fed through the passageway 14 into the chamber 18 with plastic introduced through the passageway 15 utilized to continuously coat said glass thread which may be thereafter utilized in various ways. For example, the glass thread containing a coating of a suitable resin such as a polyester, polycarbonate, polymide or other resin, ceramic or other material may be fed from the tool 16 onto a rotating form for fabricating a so-called "filament wound" article of manufacture. Such an apparatus would include means for either longitudinally moving the rotating article or the tooling illustrated in either FIGS. 1, 3 or 4.

H. The material introduced through passageways 15 and/or passageway 14 may comprise reinforcing filaments such as glass fibers, graphite fibers, whiskers of metal or other material which is continuously formed prior to admission to said passageways and fed continuously thereto as one or more continuous filaments or as a random array of short filaments fed either by mechanical means or in a liquid or molten stream or a slurry of the matrix material through the head 11 to the receiving chamber.

I. The material or materials introduced into passageways 14 and 15 may be formed into filaments beyond the head 11' and dispensed as a random or tangled mass of filaments into a mold or chamber larger than that shown to provide a matte-like mass which may be formed to shape in a mold or die or disposed against a moving or stationery surface to form a sheet or shell-like molding.

J. In another form of the invention, the material introduced through passageways 15 to form filaments may comprise a high-temperature polymer such as a polymide, aromatic polyamide, polyoxadiazole, polyphenyltriazole or other suitable resin capable of forming reinforcing fibers while the material introduced through passageway 15 may comprise a molten metal, ceramic, glass or polymer introduced either at a temperature just below that at which the high temperature polymer will degrade or at a temperature such as to cause the high temperature polymer to carbonize and form high strength carbon filamentary material for reinforcing the matrix when it solidifies. Certain high-temperature aromatic polymers, for example, will survive at temperatures as high as 1650° F. while the melting points of aluminum, magnesium, zinc and certain other metals and their alloys is substantially below such temperature. Boron nitrogen polymers have been synthesized which have a melting point in excess of 2300° centigrade. This is substantially higher than the melting points of iron, titanium, copper, beryllium, nickle and other structural metals. Accordingly, depending on the melting point of the matrix material and the manner in which it is flowed to the die or mold from the injection head as well as the desired dimensions of the filaments or fibers, various organic and inorganic polymers may be introduced through passageways 15 and combined with the metal matrix in a molten or preformed condition as a plurality of continuous filaments, an array or short randomly distributed filaments or an array or short filaments which are predeterminately aligned within the matrix along flow lines in the extrusion or molding.

Utilizing such high temperature polymers, the material introduced through passageway 14 may comprise a ceramic or glass in a molten condition which becomes internally reinforced by and/or decorated with the filaments distributed therein as described.

K. In yet another form of the invention, the material introduced through passageway 14 to form the matrix may comprise a material which is set or rigidized within the die or mold about the filaments or reinforcing elements introduced therewith by the application of heat thereto in or beyond said die or mold. For example, if the filamentary material is a high temperature plastic as described, a high temperature ceramic such as aluminum oxide, silicon carbide, boron or boron nitride, suitable metal or whisker elements and the matrix material is powdered metal, the powdered metal may be sintered in the mold or in or beyond the die into which it is introduced and formed to shape by the application of suitable controlled heat to the die or mold and/or the sintered member extruded from said die.

If the matrix material is a ceramic or high temperature thermosetting resin capable of being rigidized with heat, such rigidizing or setting of the matrix may be effected after introduction of the filaments thereto as described by application of suitable heat to the die or mold and/or the extrusion formed in said die of said matrix and filamentary materials.

L. Filament reinforced cellular materials made of metals, ceramics or high temperature resins may be formed by the apparatus described which is modified to permit the blowing of the matrix material into a cellular mass after it has extruded or flowed from the injection nozzle as the filaments are admitted thereto so as to form strong, light-weight composite materials which are internally reinforced with metal, ceramic, polymeric or carbon filaments as described. Nitrogen or other inert gas may be introduced through one or more of the passageways 15 as a steady stream or one or more intermittent pulsed gas streams operative to form cells in the matrix material which solidifies immediately in the mold or die as the gas bubbles are injected therein and the filaments are admitted thereto.

M. In yet another modified form of the instant invention, it is noted that the plural material feeding means defined herein and illustrated in FIGS. 1 to 5 may be modified as to shape and location of the inlet passageways feeding said materials to an extrusion die for the coextrusion of molten metal and plastic or a heated billet of metal and a molten high temperature plastic of the type defined in paragraph J above to provide composite extrusions made in part of metal and plastic. For example, utilizing said high temperature plastics, various extruded shapes may be formed having complete portions of their cross sections made of metal while other complete portions thereof may be made of high temperature plastic which is extruded in situ onto the metal as or immediately after it is extruded to shape. The metal may comprise, for example, aluminum or magnesium which is extruded from a billet and the extruded shape passed through a second die downstream of the aluminum extrusion die which second die is substantially equal in shape or slightly smaller in cross section than the first die and contains means for introducing said high temperature plastic in situ against the surface of the metal extrusion. The second die may also comprise a die which is open on one side and operative to have such opening compressively sealed against the surface of the metal extrusion formed in the first die. The second die may be closed at its rear face and so abutted against the extrusion as it is fed so as to provide a dynamic seal therewith with the exception of the opening in the front face of the second die through which the high temperature plastic is fed.

High temperature plastic as described may also be introduced into an annular opening or clearance volume in the same die used to form the extrusion of metal to shape for forming the high temperature plastic to shape on the metal extrusion.

If the metal extrusion die is operative to form a metal tube or pipe, high temperature plastic may be introduced through the mandrel over which the pipe is formed and may be flow coated or sprayed onto the inside surface of the metal pipe so extruded, to form a layer or coating thereon for protecting the inside surface of the pipe from corrosion. Simultaneously with the extrusion of the metal pipe, a high temperature polymer as described may be extrusion or spray coated onto the outside surface of the freshly formed metal pipe preferably before a substantial oxide has formed thereon. The heat of the pipe as extruded may be utilized to cure or set the polymer. If the polymer is introduced as a powdered or particulate material, the heat of the freshly extruded metal may be utilized to melt the high temperature polymer to form a uniform coating thereon. Such plastic particles may be flowed as a steady stream against the hot pipe with excess particles collected and recirculated. The particles may also be fluidized in a fluidized bed defined by a container through which the freshly extruded pipe may be passed immediately upon being extruded.

Metal wire or rod may be extruded or hot rolled to shape in a mill and immediately coated with a high temperature polymer as described by passing the wire through a fluidized bed of particles of said polymer, a molten container of same, past spray or roller application means or thru a die to which said polymer is fed at constant rate. In another technique, a metal wire, rod, tube or other shape may be freshly extruded or drawn to shape at elevated temperature and may be coated with a monomer of a high temperature polymer which is polymerized thereafter in situ on the wire or tube by means of the heat thereof an/or other auxilliary means such as radiation, chemical means, etc. to which said coating of monomer is subjected just prior to or after being deposited.

N. The injection means provided in FIGS. 1 and 2 or a modified form thereof may be utilized for injecting and molding or extruding high-temperature polymers to shape. For example, the passageway or passageways H provided in the injector nozzle 11 may be made to conduct a hot gas or liquid or a plasma at high temperature for maintaining the temperature of the plastic sufficiently high to retain it in a molten or flowable condition. The passageways H' immediately adjacent the injection nozzle 11 may contain a hot fluid to maintain the high-temperature plastic in a molten condition as it flows into the mold or die. Depending on the characteristics of the plastic employed, the passageways H' may contain a refrigerant or other fluid operative to transfer heat away from the entrance to the mold or die 16 so as to solidify or set the high-temperature in the mold or die as soon as it enters same or shortly thereafter. Certain of the passageways H of the nozzle 11 may contain coolant fluid to initiate setting of the plastic or reduce its temperature whereby it will set shortly after entering the die or mold. Or resistance heating elements may be disposed in the passageways H and/or H'.

I claim:

1. A method for producing a composite article comprising:
   rendering a first material in a molten condition,
   passing said first material into a chamber in such molten condition,
   rendering a second material having a melting point above that of said first material also in a molten condition,
   continuously forcing said second material, while molten, through an orifice communicating with said chamber whereby said second material is formed to shape as it passes through said orifice and is passed continuously, as formed, into the molten first material in said chamber, and
   surrounding said second material with said first material in said chamber and causing said first and second materials to completely fill said chamber,
   transferring heat from said second material to said first material so as to solidify said second material within said first material, and
   thereafter forming said first and second materials into an article by forcing said materials from said chamber and setting and solidifying said first material into a defined shape about said second material to provide a composite material composed of a discrete structural formation of said first and second materials.

2. A method in accordance with claim 1 wherein said second material is in a molten condition when it enters said chamber and said first material is flowed at a rate such that it substantially fills the volume of said chamber which is unoccupied by said second material and completely surrounds the molten second material, and wherein said chamber has a wall which extends smoothly therefrom into a mold, said first material being molded to shape in said mold.

3. A method in accordance with claim 1 including forming said first material containing said second material disposed therein into a continuous elongated member of substantially constant cross-sectional shape in an extrusion die connected to said chamber and solidifying said elongated member as it passes from said die into a composite extrusion.

4. A method in accordance with claim 2 wherein predetermined quantities of said first and second materials are flowed into said chamber and combined and thereafter molded to a predetermined shape.

5. A method in accordance with claim 4 including flowing said first material containing said second material contained therein into a mold from said chamber and solidifying both said first and second materials to the shape of the mold cavity.

6. A method in accordance with claim 1 including flowing said second material as a plurality of separate filamentary formations into said chamber and wherein all of said filamentary formations are surrounded by said molten first material to which heat is transferred therefrom.

7. A method in accordance with claim 6 wherein said second material is passed through a plurality of orifices communicating with said chamber and is formed into a plurality of filaments.

8. A method in accordance with claim 1 wherein said first and second materials are different thermoplastic resins and said second material is solidified in situ within said first material by transferring heat to said first material.

* * * * *